Nov. 2, 1937.  E. LIHOTZKY  2,097,494
ILLUMINATING DEVICE FOR MICROSCOPES
Filed Nov. 27, 1935  2 Sheets-Sheet 1
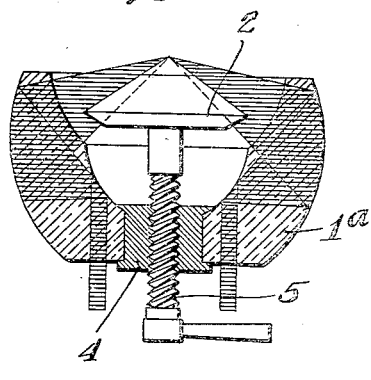
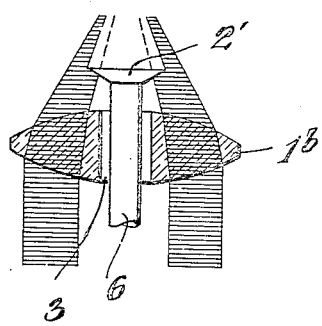
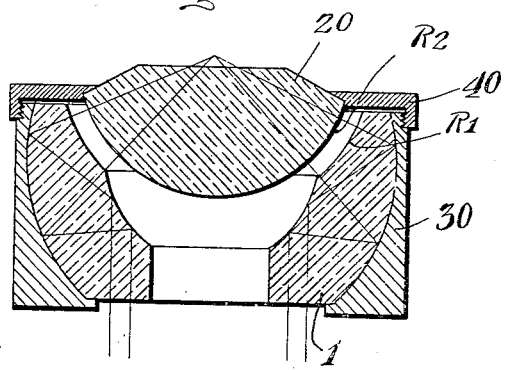
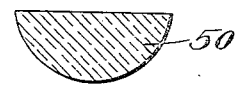
INVENTOR
Erwin Lihotzky
BY
ATTORNEY

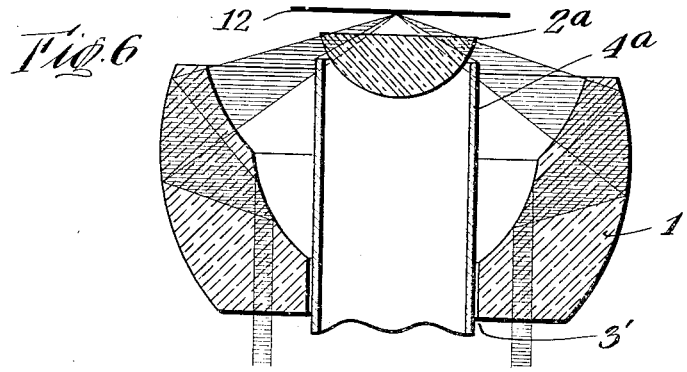
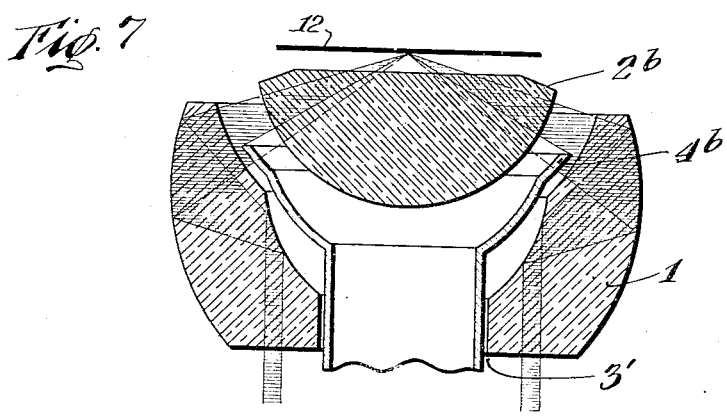
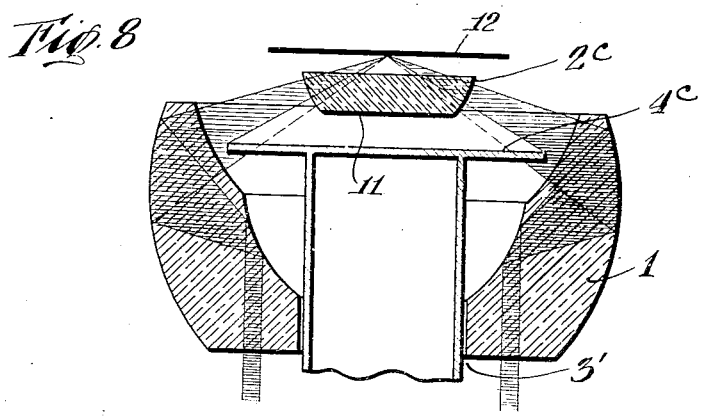

Patented Nov. 2, 1937

2,097,494

UNITED STATES PATENT OFFICE 2,097,494

ILLUMINATING DEVICE FOR MICROSCOPES

Erwin Lihotzky, Wetzlar, Germany, assignor to Ernst Leitz, G. m. b. H., Wetzlar, Germany Application November 27, 1935, Serial No. 51,755
In Germany November 29, 1934

1 Claim. (Cl. 88—40)

This invention relates to an illuminating device for microscopes, and includes an optical part and a mechanical part, the optical part being preferably so devised as to enable the use of the condenser employed for dry observations in the opaque field also with immersion observation in said field.

The mechanical part refers particularly to a microcondenser for opaque field illumination in which a light obstructing element or shutter is movably arranged upon the side directed towards the object, for the purpose of allowing an enlargement or increase in the lower aperture limit of the condenser with apertures of a higher degree.

It has been proposed heretofore, to place an insert shutter upon the face of the condenser directed towards the object, however, such an arrangement will allow a single change in the aperture limit of the condenser only. In many instances it is desirable to adapt this aperture limit to the objective used in order to prevent with greater apertures the passage of disturbing direct light rays.

It is the object of my invention to avoid this disadvantage by the provision of a shutter or light obstructing element which is axially displaceable relatively to the condenser.

With this end in view, the light obstructing element is provided with a member passing through a bore in the glass body and connecting this element with an operating member will allow the condenser to be constantly moved to and fro.

The optical part of my invention also includes means to enable the use of such condensers for dry observations in the opaque field also for use as immersion condensers for such fields.

The special condensers for opaque field observations constructed heretofore could either be used as dry condensers only or as immersion condensers only, because considerable difficulties of an optical nature were encountered when an attempt was made to use an immersion condenser also as dry condenser by dispensing with the immersion liquid, and these difficulties made the use of such condensers impracticable.

According to this invention these difficulties are readily overcome by optically constructing a condenser of a plurality of parts which may be combined according to requirement or necessity. To the basic condenser for dry observation in the opaque field, mentioned above, I add one or a plurality of lens parts to provide an opaque field condenser which may be used for other purposes also, and which presents a different aperture range, has another focal distance and which is well suited for use as immersion condenser.

In this instance the aperture shutter or light obstructing member cannot be arranged in front of the condenser but must be inserted between the lens parts.

These and other objects and advantages of my invention will become more fully known as the description thereof proceeds, and will then be more specifically defined in the appended claim.

In the accompanying drawings, forming a material part of this disclosure:

Fig. 1 illustrates a bi-spheric opaque field condenser constructed according to my invention.

Fig. 2 shows a modified form thereof.

Fig. 3 illustrates a bi-spheric mirror condenser combined with a plane convex lens in section.

Fig. 4 shows a plane convex lens in section.

Fig. 5 illustrates a modified form of plane convex lens in section.

Figs. 6, 7 and 8 illustrate various forms of cylindrical aperture shutters.

As illustrated in Figure 1, the glass body 1a of an opaque field condenser has a central bore for the reception of a guide member 4 with inner threads through which a member 5 with external threads is guided, the upper end of which is secured in the light obstructing body or shutter 2, while its lower end is equipped with a manipulating member, so that during the operation of this member the axle or member 5 may be rotated and the shutter can be moved to and fro in order to increase the lower aperture limit of the condenser as indicated by the hatched illustration of the illuminating ray bunch.

In Figure 2, the guide axle 6 for the shutter 2' is guided through the bore 3 of a lens condensator 1b, and the regulation of the lower aperture limit can be effected through the displacement of the condenser or of the shutter to a desired degree.

As shown in Figures 3, 4 and 5, the bi-sperhic condenser 1 for opaque field per se could be used for dry systems, however, by adding another lens 20 a liquid may be placed upon the surface facing the object and thus the combined device may be used as an immersion condenser. The succeeding faces R1 and R2 may either have no influence on the ray passage or they may be used for the purpose of correction. Parts 1 and 20 which are optical may be combined by means of their holders 30 and 40 by means of threaded clamping springs or the like. The modified forms of additional lens parts 50 and 60 may be used either alone or in combination with the part 1 for special dark field condensers.

As illustrated in Figures 6, 7 and 8 the shutter or light obstructing body 4a may have the form of a cylinder owing to the comparatively small dimension of the additional lens 2a as in Figure 6 or even with the somewhat larger lens 2b in Figure 7 and the shutter 4b in its form must be made to conform to the spherical surface, or as shown in Figure 8, a body having a plane surface 4c may be used as shutter, as the additional lens 2c has an optically idle ground face 11, and in all these constructions the cylindrical light obstructing body is passed through a bore 3' in the condenser 1 for opaque dry condensation. The specimen slide 12 of the microscope is shown as a straight line.

It will be understood that I have described and shown the preferred forms of my construction only as few of the many examples to practically construct the same, and that I may make such changes in the general arrangement of the elements and their individual construction as come within the scope of the appended claim without departure from the spirit of my invention and the principles involved.

Having thus described my invention, what I claim as new and desire to secure by Letters Patent is:

Illuminating device for microscopes comprising a shutter, a glass body condenser having a central bore, a threaded guide in said bore, a threaded axle passed through the threaded bore in said guide and connected to said shutter, and an operating member on the other end of said axle to move the shutter axially and relatively to the condenser.

ERWIN LIHOTZKY.